United States Patent
Wheeland et al.

(10) Patent No.: US 10,277,058 B2
(45) Date of Patent: Apr. 30, 2019

(54) NEAR FIELD COMMUNICATION (NFC) COEXISTANCE

(71) Applicant: QUALCOMM Incorporated, San Diego, CA (US)

(72) Inventors: Cody Burton Wheeland, San Diego, CA (US); William Henry Von Novak, III, San Diego, CA (US); Linda Stacey Irish, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 15/373,561

(22) Filed: Dec. 9, 2016

(65) Prior Publication Data
US 2017/0331317 A1   Nov. 16, 2017

Related U.S. Application Data

(60) Provisional application No. 62/337,145, filed on May 16, 2016.

(51) Int. Cl.
*H01M 10/44* (2006.01)
*H01M 10/46* (2006.01)
(Continued)

(52) U.S. Cl.
CPC .............. *H02J 7/025* (2013.01); *H02J 50/10* (2016.02); *H02J 50/12* (2016.02); *H02J 50/20* (2016.02);
(Continued)

(58) Field of Classification Search
CPC .......... H02J 7/355; H02J 7/0042; H02J 5/005; H02J 7/025
(Continued)

(56) References Cited

U.S. PATENT DOCUMENTS

| | | |
|---|---|---|
| 2012/0149301 A1 | 6/2012 | Wiley |
| 2013/0062959 A1 | 3/2013 | Lee et al. |

(Continued)

FOREIGN PATENT DOCUMENTS

| | | |
|---|---|---|
| KR | 20140011756 A | 1/2014 |
| WO | WO-2015144389 A1 | 10/2015 |

OTHER PUBLICATIONS

International Search Report and Written Opinion—PCT/US2017/031108—ISA/EPO—dated Sep. 27, 2017.
(Continued)

*Primary Examiner* — Edward Tso
(74) *Attorney, Agent, or Firm* — Patterson & Sheridan, LLP

(57) ABSTRACT

Certain aspects of the present disclosure are generally directed to apparatus and techniques for protecting electronic devices that may be prone to damage by wireless charging fields. For example, the apparatus may include a wireless charging circuit configured to selectively generate a wireless charging field and an impedance detection circuit coupled to the wireless charging circuit and configured to detect an impedance change corresponding to the wireless charging field. In this case, a proximity detection circuit may selectively detect proximity of one or more electronic devices that are prone to damage by the wireless charging circuit. In some aspects, detecting the proximity of the one or more electronic devices is activated based on detecting the impedance change, and wherein generating the wireless charging field comprises reducing a transmit power of the wireless charging field based on detecting the impedance change.

29 Claims, 8 Drawing Sheets

(51) Int. Cl.
| | |
|---|---|
| *H02J 7/02* | (2016.01) |
| *H02J 50/80* | (2016.01) |
| *H02J 50/90* | (2016.01) |
| *H02J 50/12* | (2016.01) |
| *H04B 5/00* | (2006.01) |
| *H02J 50/10* | (2016.01) |
| *H02J 50/20* | (2016.01) |

(52) U.S. Cl.
CPC .............. *H02J 50/80* (2016.02); *H02J 50/90* (2016.02); *H04B 5/0037* (2013.01); *H04B 5/0087* (2013.01); *H04B 5/0062* (2013.01)

(58) Field of Classification Search
USPC .................................. 320/107, 108; 307/104
See application file for complete search history.

(56) References Cited

U.S. PATENT DOCUMENTS

| | | | |
|---|---|---|---|
| 2015/0042168 A1* | 2/2015 | Widmer .............. | B60L 11/1829 307/104 |
| 2015/0177293 A1 | 6/2015 | McFarthing | |
| 2015/0263540 A1* | 9/2015 | Culbert ..................... | G06F 1/26 307/104 |

OTHER PUBLICATIONS

Partial International Search Report—PCT/US2017/031108—ISA/EPO—dated Jul. 5, 2017.

* cited by examiner

NEAR FIELD COMMUNICATION (NFC) COEXISTANCE

CLAIM OF PRIORITY UNDER 35 U.S.C. § 119

The present application claims the benefit of U.S. Provisional Application Ser. No. 62/337,145, entitled "NEAR FIELD COMMUNICATION (NFC) COEXISTANCE" and filed May 16, 2016, which is assigned to the assignee of the present application and is expressly incorporated by reference herein in its entirety.

TECHNICAL FIELD

The present disclosure relates generally to electronic devices, and in particular, to wireless charging of electronic devices.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly consume greater amounts of power. As such, these devices are constantly recharging. Rechargeable devices are often charged via wired connections that use cables or other similar connectors that are physically connected to a power supply. Cables and similar connectors may sometimes be inconvenient or cumbersome and have other drawbacks. Wireless power charging systems, for example, may allow users to charge and/or power electronic devices without physical, electrical connections, thus reducing the number of components for operation of the electronic devices and simplifying the use of the electronic device.

There is flexibility in having different sizes and shapes in the components (e.g., magnetic coil, charging plate, etc.) that make up a wireless power transmitter and/or a wireless power receiver in terms of industrial design and support for a wide range of devices.

SUMMARY

Certain aspects of the present disclosure are directed to an apparatus for wireless charging. The apparatus may generally include a wireless charging circuit configured to selectively generate a wireless charging field, an impedance detection circuit coupled to the wireless charging circuit and configured to detect an impedance change corresponding to the wireless charging field, and a proximity detection circuit configured to selectively detect proximity of one or more electronic devices that are prone to damage by the wireless charging circuit, wherein detecting the proximity of the one or more electronic devices is activated based on detecting the impedance change, and wherein generating the wireless charging field comprises reducing a transmit power of the wireless charging field based on detecting the impedance change.

Certain aspects of the present disclosure are directed to an apparatus for wireless charging. The apparatus generally includes a wireless charging circuit, a proximity detection circuit, a first coil having a first terminal coupled to the first wireless charging circuit and a second terminal coupled to the proximity detection circuit, a second coil having a first terminal coupled to the wireless charging circuit and a second terminal coupled to the proximity detection circuit, at least one first switch coupled between the first terminals of the first coil and the second coil, and at least one second switch coupled between the second terminals of the first coil and the second coil.

Certain aspects of the present disclosure are directed to a method for wireless charging. The method generally includes selectively generating a wireless charging field, detecting an impedance change corresponding to the wireless charging field, and selectively detecting proximity of one or more electronic devices that are prone to damage by the wireless charging field, wherein detecting the proximity of the one or more electronic devices is activated based on detecting the impedance change, and wherein generating the wireless charging field comprises reducing a transmit power of the wireless charging field based on detecting the impedance change.

Certain aspects of the present disclosure are directed to an apparatus for wireless charging. The apparatus generally includes means for selectively generating a wireless charging field, means for detecting an impedance change corresponding to the wireless charging field, and means for selectively detecting proximity of one or more electronic devices that are prone to damage by the wireless charging field, wherein detecting the proximity of the one or more electronic devices is activated based on detecting the impedance change, and wherein means for generating the wireless charging field comprises means for reducing a transmit power of the wireless charging field based on detecting the impedance change.

Certain aspects of the present disclosure are directed to a method for wireless charging for wireless charging. The method generally includes selectively transmitting, during one or more first time intervals, one or more beacons for detection of one or more electronic devices to be charged, and selectively detecting proximity of one or more other electronic devices that are prone to damage by a wireless charging field during one or more second time intervals that are different than the one or more first time intervals.

Certain aspects of the present disclosure are directed to a method for wireless charging for wireless charging. The method generally includes selectively generating a wireless charging field, and detecting an impedance change corresponding to the wireless charging field, and selectively detecting proximity of one or more electronic devices that are prone to damage by the wireless charging field, wherein detecting the proximity of the one or more electronic devices is activated based on detecting the impedance change, and wherein generating the wireless charging field is disabled based on detecting the impedance change, wherein the one or more electronic devices comprise at least one of a near-field communication (NFC) card or radio-frequency identification (RFID) card, and wherein selectively detecting proximity of one or more electronic devices comprises modulating a detection field for detecting the at least one NFC card or RFID card, wherein detecting the at least one NFC card or RFID card is based on receiving information via modulation of the detection field by the at least one NFC card or RFID card.

Other aspects, features, and embodiments of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, all aspects of the present disclosure can include one or more of the advantageous features discussed herein. In other words, while one or more aspects may be discussed as having certain advantageous features, one or more of such features may also be used in accordance with the various aspects of the present disclosure. In similar fashion, while exemplary aspects may be discussed below as device, system, or method aspects it should be understood that such exemplary aspects can be implemented in various devices, systems, and methods.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

Figure 1:
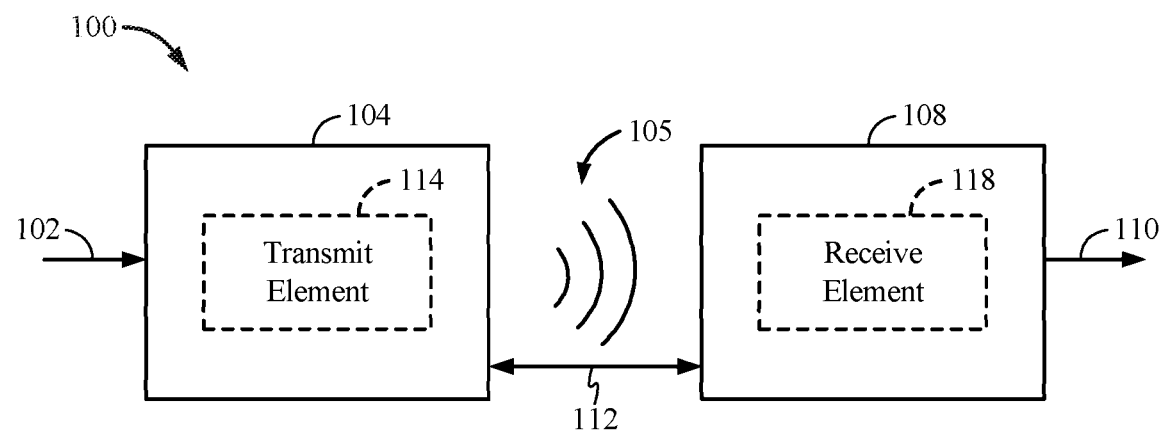
FIG. 1 is a functional block diagram of a wireless power transfer system, in accordance with certain aspects of the present disclosure.

Drawing elements that are common among the following figures may be identified using the same reference numerals.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

FIG. 1 is a functional block diagram of a wireless power transfer system 100, in accordance with certain aspects of the present disclosure. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative aspect, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain aspects, the wireless field 105 may correspond to the "near field" of the transmitter 104. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain aspects, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
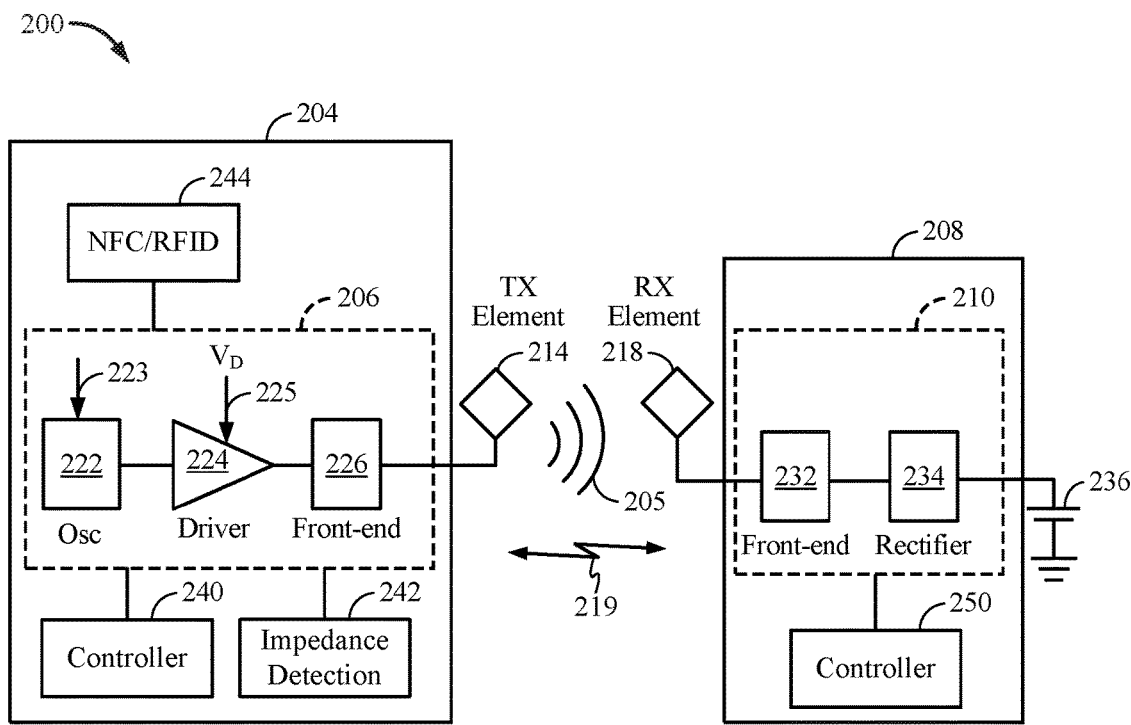
FIG. 2 is a functional block diagram of a wireless power transfer system, in accordance with certain aspects of the present disclosure.

FIG. 2 is a functional block diagram of a wireless power transfer system 200, in accordance with certain aspects of the present disclosure. The system 200 may include a transmitter 204 and a receiver 208. The transmitter 204 (also referred to herein as power transfer unit, PTU) may include transmit circuitry 206 that may include an oscillator 222, a driver circuit 224, and a front-end circuit 226. The oscillator 222 may be configured to generate an oscillator signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal ($V_D$) 225. The driver circuit 224 may be a switching amplifier configured to receive a square wave from the oscillator 222 and output a sine wave. In certain aspects, the transmitter 204 may include an impedance detection circuit 242 that may be configured to detect the receiver 208 to be charged by sensing the change in impedance as seen by the driver circuit 224 driving the power transmitting element 214.

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load.

The transmitter 204 may further include a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer. In certain aspects, the transmitter 204 may also include a near-field communication (NFC) circuit and/or radio frequency identification (RFID) circuit that may be configured to control the transmit circuitry 206 for detection of NFC and/or RFID devices. For example, the NFC and/or RFID circuits may transmit (e.g., via transmit circuitry 206) one or more detection fields and detect proximity of NFC and/or RFID devices by detecting modulations of the detection fields.

The receiver 208 (also referred to herein as power receiving unit, PRU) may include receive circuitry 210 that may include a front-end circuit 232 and a rectifier circuit 234. The front-end circuit 232 may include matching circuitry configured to match the impedance of the receive circuitry 210 to the impedance of the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. In certain aspects, the transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter 204 and the receiver 208.

Figure 3:
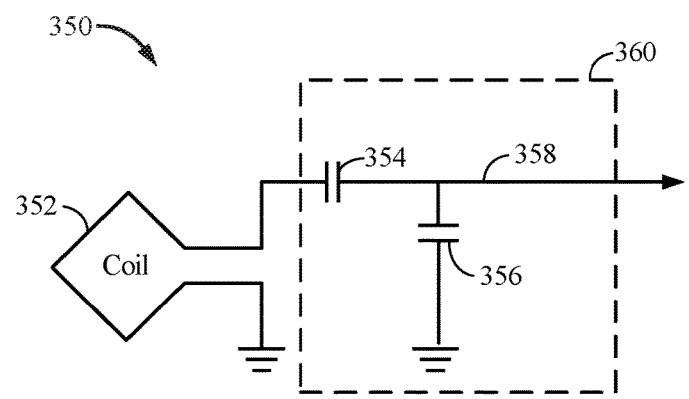
FIG. 3 is a schematic diagram of a portion of transmit circuitry or receive circuitry of FIG. 2 including a power transmitting or receiving element, in accordance with certain aspects of the present disclosure.

FIG. 3 is a schematic diagram of a portion of the transmit circuitry 206 or the receive circuitry 210 of FIG. 2, in accordance with certain aspects of the present disclosure. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another antenna. The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non limiting example, the tuning circuit 360 may comprise a capacitor 354 and a capacitor 356, which may be added to the transmit and/or receive circuitry 350 to create a resonant circuit.

The tuning circuit 360 may include other components to form a resonant circuit with the power transmitting or receiving element 352. As another non limiting example, the tuning circuit 360 may include a capacitor (not shown) placed in parallel between the two terminals of the circuitry 350. Still other designs are possible. In some aspects, the tuning circuit in the front-end circuit 226 may have the same design (e.g., 360) as the tuning circuit in front-end circuit 232. In other aspects, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Although aspects disclosed herein may be generally directed to resonant wireless power transfer, persons of ordinary skill will appreciate that aspects disclosed herein may be used in non-resonant implementations for wireless power transfer.

Near Field Communication (NFC) Coexistance With Wireless Charging

Aspects of the present disclosure are generally directed to a dedicated transceiver that can detect electronic devices that can potentially be damaged by wireless charging fields. For example, aspects of the present disclosure provide techniques for detection and protection of NFC and/or radio frequency identification (RFID) devices. It should be noted, that though certain aspects are described herein with respect to NFC and/or RFID devices, the same principles can be applied to other suitable types of devices.

NFC or RFID devices can be damaged by the high amplitude magnetic field generated by wireless chargers. Some devices may be resistant to damage by wireless chargers due to their tuning to a different frequency. For example; a frequency of 13.56 MHz may be used for NFC or RFID devices and a frequency of 6.78 MHz may be used for wireless charging. However, some low quality devices, such as low quality integrated capacitors, have sufficiently low quality factor (Q) that they may be subject to damage from wireless charging fields. For example, low quality capacitors may experiences changes in their capacitance value at the power levels involved when wirelessly charging. In certain aspects, in order to avoid damage to these devices, the transmission power of the wireless charging field may be reduced, and in some cases disabled, when these devices are present.

Certain aspects of the present disclosure may use a dedicated reader for NFC/RFID detection. In certain aspects, NFC/RFID detection may be activated once the wireless charging field has been deactivated, and any activation of the wireless charging field may be prevented if any modulation is detected, indicating proximity of one or more NFC/RFID devices that may be subject to damage by the wireless charging field. In order to detect the NFC/RFID devices when the wireless charging field is on, an impedance detection circuit may be used to detect an impedance shift corresponding to the wireless charging field, based on which the wireless charging field may be deactivated and proximity detection of the NFC/RFID devices may be activated.

Figure 4:
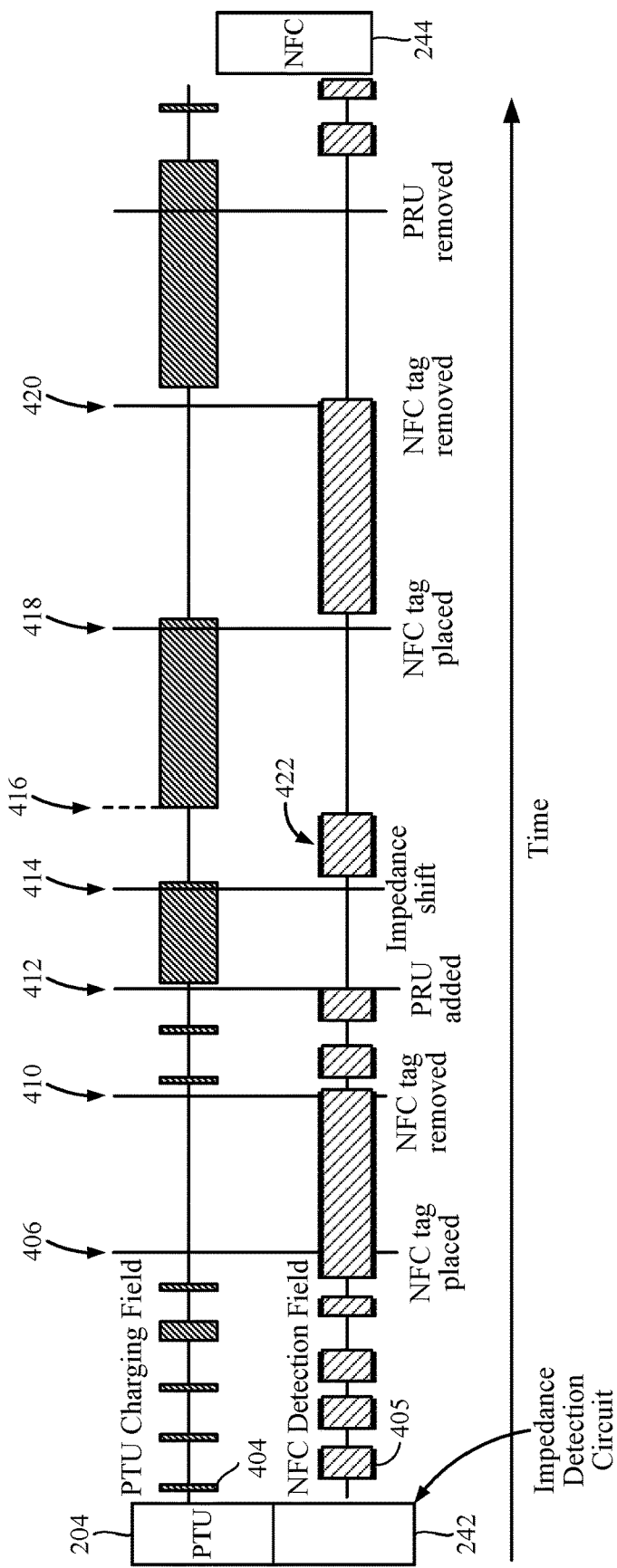
FIG. 4 illustrates example charging and detection fields, in accordance with certain aspects of the present disclosure.

FIG. 4 illustrates example charging and detection fields, in accordance with certain aspects of the present disclosure. In FIG. 4, time is shown as increasing along the horizontal axis. Further, periods of time where the charging (e.g., along the top axis) and/or detection fields (e.g., along the bottom axis) are activated are shown as pulses along the axis, while periods of time where the charging is deactivated are shown as empty along the axis.

In certain aspects, a wireless charging circuit may include a power transmission unit (PTU) 204 configured to generate wireless charging fields. For example, the PTU 204 may transmit beacon transmissions 404 (e.g., beacons) via the power transmitting element 214. The beacon transmissions are small pulses of charging fields used to detect a power receiver unit (PRU) to be charged and potentially provide a small amount of power for powering one or more elements of the PRU. For example, an impedance detection circuit 242 coupled to the PTU 204 may detect the PRU to be charged by sensing the change in impedance as seen by the driver circuit 224 driving the power transmitting element 214. In some aspects, the PTU 204 may detect a PRU to be charged by applying power for a duration (e.g., 100 milliseconds) and waiting for the PRU to send back an acknowledgement that it is receiving power. In some aspects, the acknowledgement may be in the form a connection request for establishing a communication link with the PTU 204. In some cases, the PTU 204 may detect a PRU to be charged by detecting the device via a proximity sensor such as a weight sensor or an infrared sensor. In other aspects, detection of the PRU may be in part based on detecting an impedance change presented to the PTU 204 that is above a threshold due to placement of the PRU within a charging region of the field generated by the PTU 204.

As illustrated, the PTU 204 may transmit the beacon transmissions 404 periodically. The PTU 204 may further include a NFC circuit 244 (or RFID circuit to detect RFID devices). The NFC circuit 244 may generate detection field 405, based on which proximity of NFC devices (e.g., NFC cards) may be detected. For example, the NFC circuit may modulate the detection field according to an NFC protocol in order to elicit modulation of the detection field by NFC devices positioned within the detection field. In response, the NFC devices may modulate the detection field in accordance with the NFC protocol, indicating the presence of the NFC device to the NFC circuit 244.

As presented above, the NFC devices may be prone to damage by the wireless charging fields. Thus, in certain aspects, once the NFC circuit 408 detects an NFC device (e.g., at 406), the PTU 204 may deactivate the transmission of the wireless charging fields (e.g., beacon transmissions 404). The NFC circuit 408 may continue to transmit the detection field 405 to sense when the NFC device is no longer in proximity (e.g., at 410), based on which the PTU 204 may reactivate the charging field transmission.

Certain aspects of the present disclosure are directed to detecting proximity of an electronic device while a PRU is being wirelessly charged. For example, at 412, a PRU may be placed in proximity to the PTU 204 and detected by the PTU 204 based on the beacon transmissions 404. For example, an impedance detection circuit 242 coupled to the PTU 204 may detect the PRU by sensing the change in impedance as seen by the driver circuit 224 driving the power transmitting element 214. In this case, the wireless charging of the PRU by the PTU 204 begins. In certain aspects, the impedance detection circuit 242 coupled to the PTU 204 may be configured to detect an impedance change (e.g., at 414) of the power transmitting element 214 generating the wireless charging field during the charging process. For example, the impedance detection circuit 242 may detect an impedance change by detecting a change in impedance of a signal (e.g., a power supply signal) presented to the wireless charging circuit while generating the wireless charging field. The impedance change may indicate that an electronic device may be in proximity to the PTU 204.

In certain aspects, to reduce the likelihood of false proximity detection, which may be caused by, for example, PRU load modulations, the detected impedance change may be compared to other impedance change information such as a profile of impedance changes detected by the impedance detection circuit 242. Thus, based on the detected impedance change, PTU 204 may deactivate the wireless charging field and the NFC circuit 408 may activate the detection field transmission (e.g., detection field 422) to determine whether an NFC device is in proximity to the PTU. If the NFC circuit 408 does not detect proximity of an NFC device, the PTU 204 may resume wireless charging (e.g., at 416). Otherwise, if an NFC device is detected, the wireless charging may remain deactivated. For example, at 418, an NFC device may be placed in proximity to the PTU 204, causing the impedance detection circuit 242 coupled to the PTU 204 to detect an impedance change at 418. Thus, the PTU 204 may deactivate the wireless charging field transmission, and the NFC circuit 408 may activate the NFC detection field transmission. In this case, the NFC circuit 408 may detect proximity of an NFC device, and the wireless charging may remain deactivated until the NFC device is removed at 420 (e.g., as detected by the NFC circuit 408).

Figure 5:
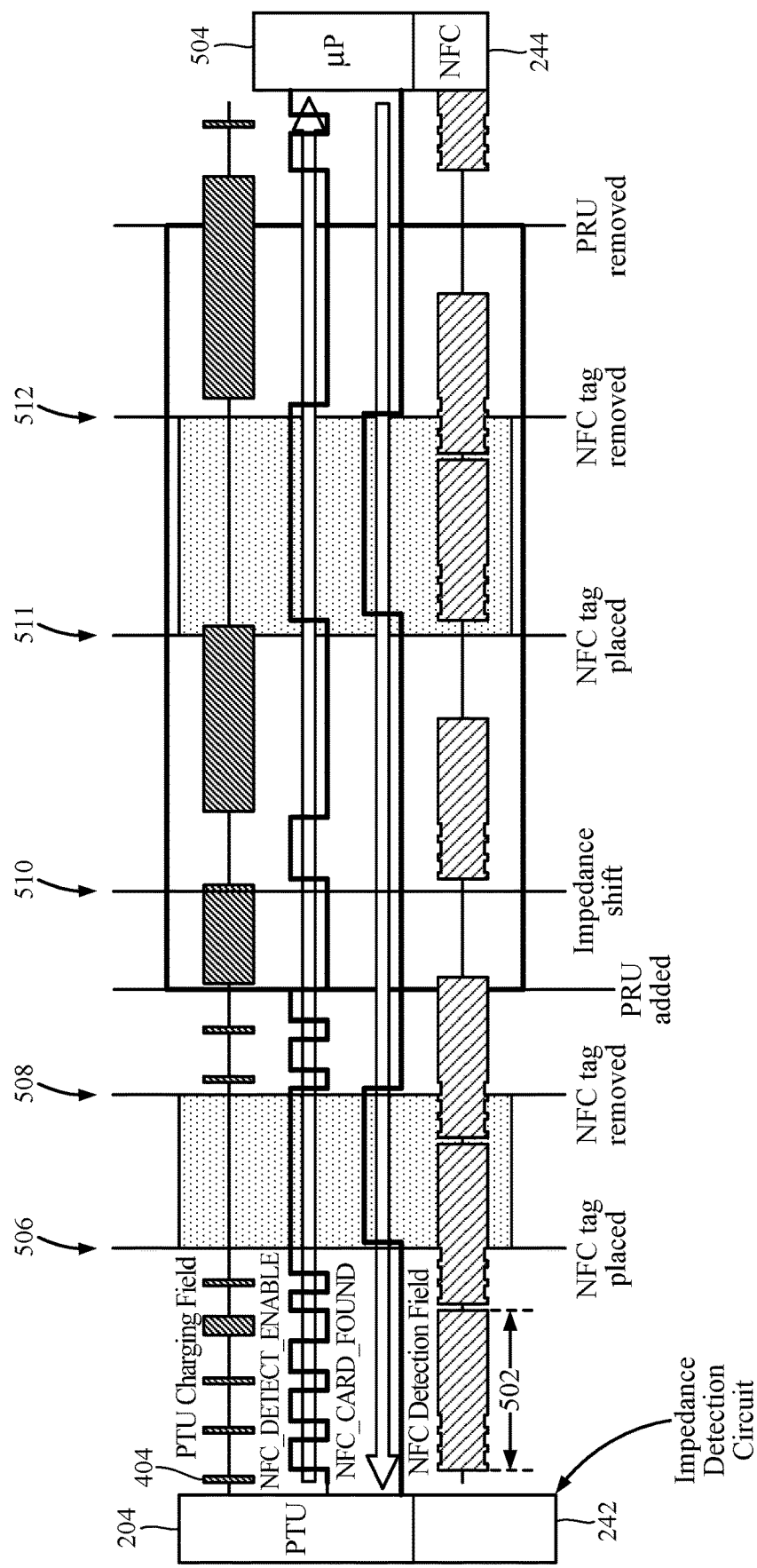
FIG. 5 illustrates example charging and detection fields and corresponding control signals, in accordance with certain aspects of the present disclosure.

FIG. 5 illustrates example charging and detection fields, in accordance with certain aspects of the present disclosure. In certain aspects, the detection fields generated by the NFC circuit 408 may continue for a set detection interval. For example, the NFC circuit 408 may generate a detection field that may continue for a detection interval 502. In this case, the PTU 204 may continue to send beacon transmissions 404 to detect a PRU to be charged, even during the detection interval 502. However, once the PTU 204 detects a PRU to be charged and begins the transmission of wireless charging fields, no further detection intervals are initiated. For example, the NFC circuit 408 may include a processor 504 (e.g., microprocessor μP). The processor 504 may receive an NFC_DETECT_ENABLE signal from the PTU 204, indicating whether the NFC circuit 408 should activate NFC detection. For example, when the NFC_DETECT_EN-ABLE signal is logic high, it may indicate that NFC detection may continue, when the PTU 204 is not transmitting a wireless charging field. That is, if the NFC_DETECT_EN-ABLE signal is logic high, a detection interval can be initiated, and if the NFC_DETECT_ENABLE signal is logic low, a detection interval cannot be initiated. In certain aspects, the wireless charging field may be prevented from activating (e.g., deactivated) whenever the NFC_DETECT_ENABLE signal is logic high.

During the detection intervals (e.g., detection interval 502), the NFC circuit 408 may detect an NFC device, and communicate the detection of the NFC device to the PTU 204 via the NFC_CARD_FOUND signal. For example, at 506, the NFC circuit 408 may detect an NFC device, and the processor 504 may switch the NFC_CARD_FOUND signal from logic low, to logic high, indicating proximity of an NFC device. When the NFC_CARD_FOUND signal is switched to logic high, the NFC_DETECT_ENABLE signal may also be kept at logic high. Thus, the PTU 204 may deactivate the transmission of the wireless charging fields (e.g., beacons). At 508, the NFC device may be removed, the NFC_CARD_FOUND signal may switch to logic low along with the NFC_DETECT_ENABLE signal, and the wireless charging field transmissions may resume.

As described above with respect to FIG. 4, the proximity of an electronic device may be detected during a charging phase based on a detection of an impedance change corresponding to the wireless charging field. For example, the PTU 204 may detect an impedance change of the power transmitting element 214 generating the wireless charging field at 510. Based on the detection of the impedance change, the PTU 204 may switch NFC_DETECT_ENABLE signal to logic high, allowing for a detection interval to begin, as illustrated. If an NFC device is not detected, the PTU 204 may switch the NFC_DETECT_ENABLE signal back to logic low and wireless charging may resume. If an NFC device is detected, the processor 504 may switch the NFC_CARD_FOUND signal to logic high, deactivating any transmission of a wireless charging field until the NFC device is removed. For example, at 511, the PTU 204 may detect an impedance change corresponding to the charging field and a detection interval may begin. In this case, an NFC device is detected by the NFC circuit 408. Thus, the processor 504 of the NFC circuit 408 switches the NFC_CARD_FOUND signal to logic high, the PTU 204 switches the NFC_DETECT_ENABLE signal to logic high, and any transmission of a wireless charging field is deactivated until the NFC device is removed at 512.

In certain aspects, the PTU 204 and the NFC circuit 244 may use coils of a similar shape so that the NFC detection field matches the wireless charging field. If the coils are more than slightly different, there may be nulls and peaks that do not align, increasing the possibility of damage to electronic devices.

In certain aspects, separate coils may be used for the PTU 204 and the NFC circuit 244. However, in some cases, a shared coil may be used for the PTU 204 and the NFC circuit 244. In either case, the parasitic loads when the wireless charging field is active should be reduced to maintain efficiency, and the NFC device should be tuned to operate over the same range of conditions as the amplifier of the wireless charging circuit, including detuning due to devices on the coils. Reduction of the parasitic load may be achieved via series switches with low series capacitance.

In certain aspects, the NFC coil may be configured to have low Q, which may be accomplished using series resistors. Using series resistors may be advantageous in certain aspects since low field effect transistor (FET) off capacitance is often a traded off for high FET on resistance, allowing the FET resistance to reduce coil Q. Series resistors allow the coil to float, preventing them from back-conducting through the FET diodes. Dual coils have the benefit of slightly reduced coupling between the two amplifiers. The two coils may be similar and close such that their coupling can be high, but not as high as a direct connection.

In certain aspects, sharing a single coil removes the additional cost of a duplicate coil, and the protection circuitry is approximately equivalent in both cases, reducing bill-of-materials (BOM) costs as compared to the dual coil option. However, such a shared coil may result in dual feeds that may detune each other, and there may be the possibility of damage, particularly to the NFC amplifier from the high voltages present from the wireless charging amplifier. In certain aspects, the shared coil option may differ from the dual coil system in that the detuning may be implemented via a shunt detuning circuit. One solution may be to use a protection circuit to isolate the NFC amplifier from the system, and taking the existing components on the wireless charging path into account when tuning the NFC path.

Figure 6:
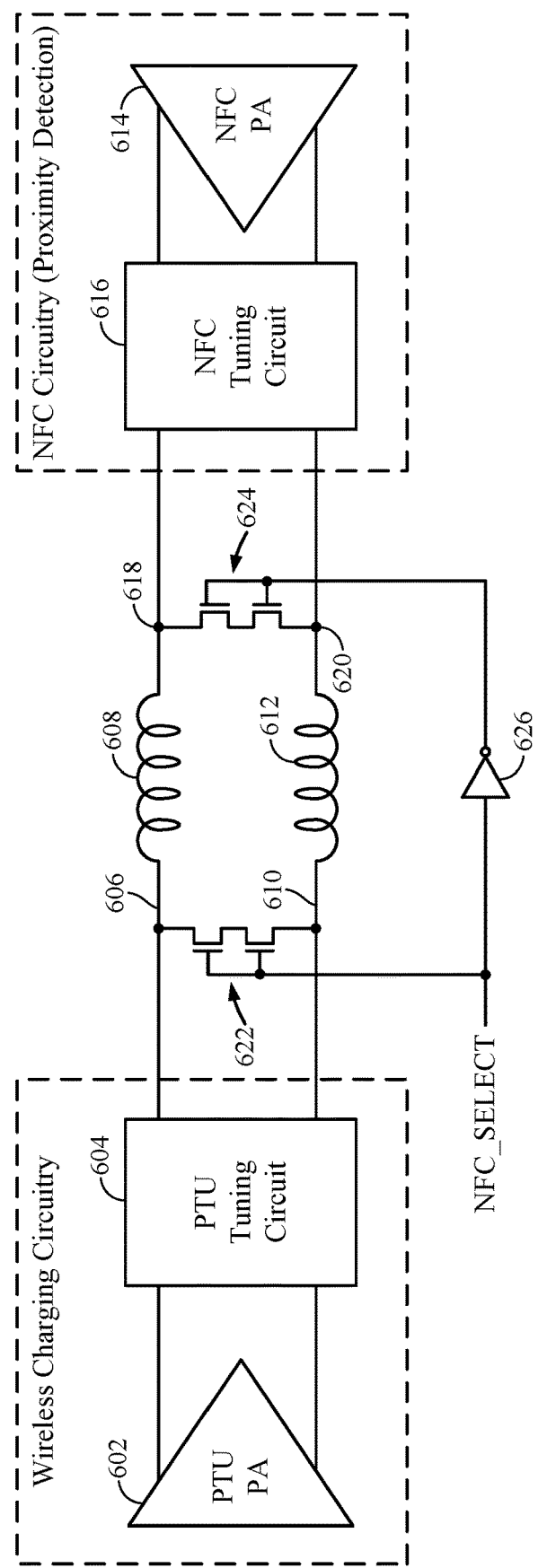
FIG. 6 illustrates an example wireless charging circuit and proximity detection circuit sharing a common coil, in accordance with certain aspects of the present disclosure.

FIG. 6 illustrates an example wireless charging circuit and proximity detection circuit sharing a common coil, in accordance with certain aspects of the present disclosure. In certain aspects, a power amplifier (PA) 602 for the PTU may be coupled to a PTU tuning circuit 604, which may be coupled to a first terminal 606 of a coil 608 and a first terminal 610 of a coil 612. An NFC PA 614 for the NFC circuit may be coupled to an NFC tuning circuit 616, which may be coupled to a second terminal 618 of the coil 608 and a second terminal 620 of the coil 612.

In certain aspects, isolation circuitry may be used to electrically isolate the wireless charging circuitry (e.g., PTU PA 602 and PTU tuning circuit 604) from the coils 608 and 612 during operation of the NFC, and vice versa. For example, a first set of cascode connected transistors 622 may be coupled between the terminals 606 and 610, and a second set of cascode connected transistors 624 may be coupled between terminals 618 and 620. During wireless charging, the transistors 624 may electrically couple the terminals 618 and 620, effectively shorting and rendering the terminals 618 and 620 as a center tap for the coils 608 and 612. In some cases, the transistors 624 may electrically couple the terminals 618 and 620 to a reference potential (e.g., an electrical ground potential). During operation of the NFC (e.g., proximity detection), transistors 622 may electrically couple the terminals 606 and 610, effectively shorting and rendering the terminals 606 and 610 as a center tap for the coils 608 and 612. In some cases, the transistors 622 may electrically couple the terminals 606 and 610 to a reference potential (e.g., an electrical ground potential). For example, the gate terminals of transistors 622 may be driven by an NFC_SELECT signal, and gate terminals of the transistors 624 may be driven by an inverse of the NFC_SELECT signal, which may be generated by an inverter 626. Therefore, by selectively coupling the terminals 606 and 610, or terminals 618 and 620, during proximity detection and wireless charging, respectively, the charging field and detection field can be tuned separately (e.g. independently). That is, during wireless charging, the PTU tuning circuit 604 can tune the wireless charging field without impact from the NFC circuitry, and during proximity detection, the NFC tuning circuit 616 can tune the detection field without impact from the wireless charging circuitry.

In certain aspects, the proximity detection may involve emulating various aspects of NFC/RFID standards. For example, in some cases, the transmission of the detection field may be modulated to induce cards (electronic devices such as NFC or RFID cards) to respond. In some cases, any modulation by the card may be detected to indicate proximity as opposed to detecting only valid responses.

In certain aspects, a custom NFC reader may be implemented using an existing PA. This approach may be implemented with improved (faster and more sensitive) modulation detection on the PRU as well as retuning of the PA matching circuits. This approach would allow reuse of the same circuitry for both wireless charging and proximity detection (e.g., NFC circuit), so the wireless charging could also benefit from the improved sensing. In certain aspects, additional parallel tuning capacitors may be switched in or out to change the tuning from 6.78 MHz (for wireless charging) to 13.56 MHz (for proximity detection via NFC), or potentially identifying a tuning circuit that operates acceptably for both. In certain aspects, the sensing circuit may be an in-phase/quadrature-phase (I/Q) demodulator, which could be dual-purposed for wireless charging field impedance detection and NFC modulation detection.

In certain aspects, the wireless charging field and a proximity detection field (e.g., for the NFC) may be transmitted simultaneously, either with separate PAs, antennas, or by inducing 2nd order harmonics on the wireless charging field. By transmitting the wireless charging field and a proximity detection field simultaneously, always-on background scanning can be implemented.

Figure 7:
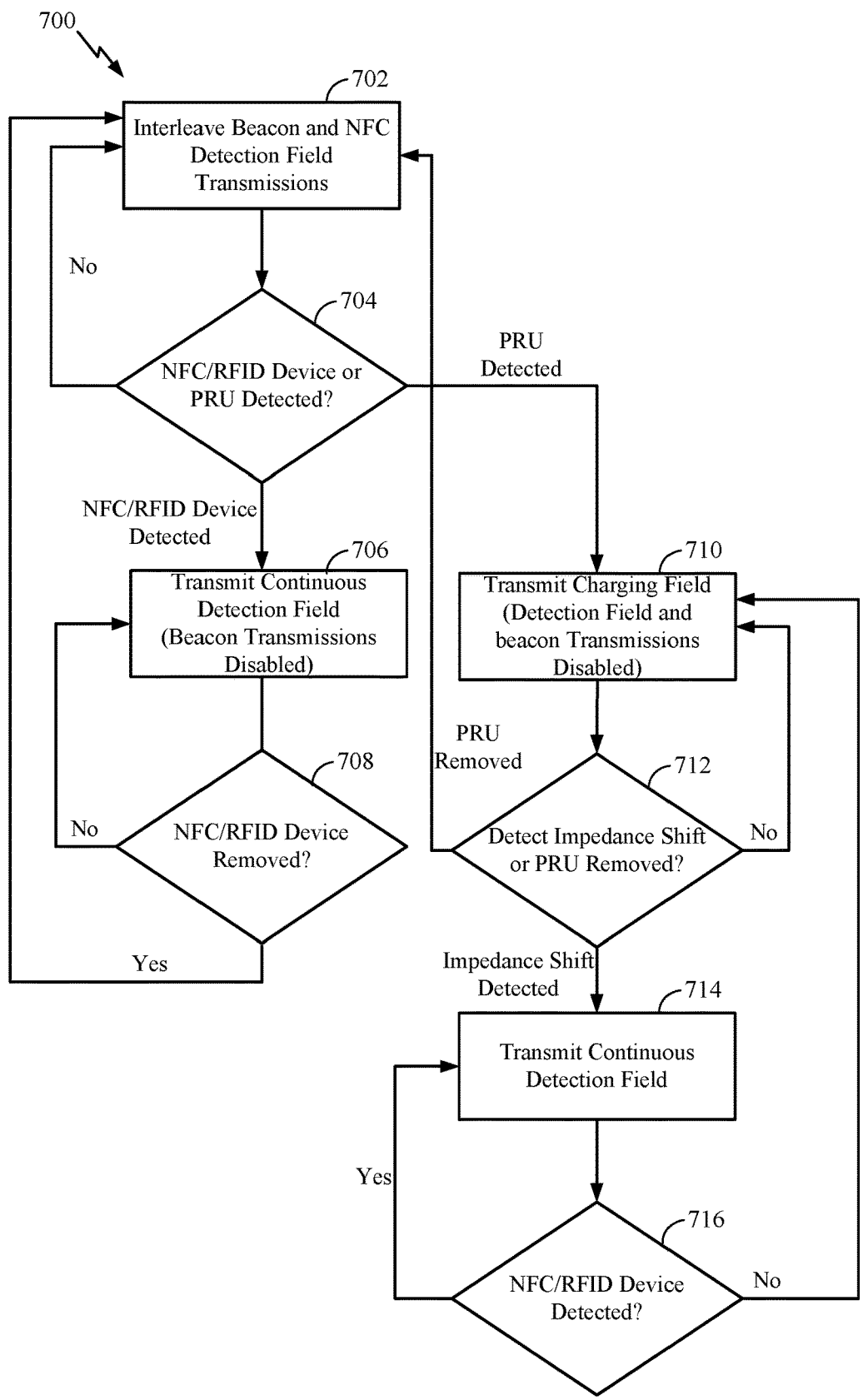
FIG. 7 is a flow diagram of example operations for wireless charging and protection of electronic devices, in accordance with certain aspects of the present disclosure.

FIG. 7 is a flow diagram of example operations 700 for wireless charging, in accordance with certain aspects of the present disclosure. The operations 700 may be performed by a circuit, such as the circuits of FIGS. 1-6.

The operations 700 may begin, at block 702, by interleaving beacon transmissions (e.g., beacon transmissions 404) and NFC detection field transmissions, as described with respect to FIGS. 4 and 5. At block 704, the circuit may determine whether an NFC/RFID device or PRU is detected. If not, the circuit may continue the beacon and NFC detection field transmissions at block 702. If an NFC/RFID device is detected, the transmit power of the beacon transmission 404 may be reduced (or disabled) and continuous detection field transmissions may begin at block 706. At block 708, the circuit determines whether the NFC/RFID device is removed (e.g., via the detection field transmission). If so, the circuit begins the interleaved beacon and detection field transmissions at block 702. Otherwise, detection field transmission at block 706 continues.

At block 704, if a PRU is detected, the circuit reduces the transmit power of (or disables) the beacon and detection field transmissions and begins, at block 710, transmitting the wireless charging field to begin charging the detected PRU. At block 712, the circuit may either detect an impedance shift or detect that the PRU is removed. Otherwise, the charging field transmissions continue at block 710. If an impedance shift is detected, the circuit reduces the transmit power of (or disables) the charging field transmissions and begins transmitting the detection field, at block 714, to detect whether an NFC/RFID device is in proximity. At block 716, the circuit detects the NFC/RFID device. If the NFC-RFID device is detected, the transmission of the detection field continues. Otherwise, the circuit again begins the transmission of the charging field at block 710. At block 712, if the circuit detects that the PRU is removed, the circuit begins the interleaved transmission of the beacon and detection fields at block 702.

Figure 8:
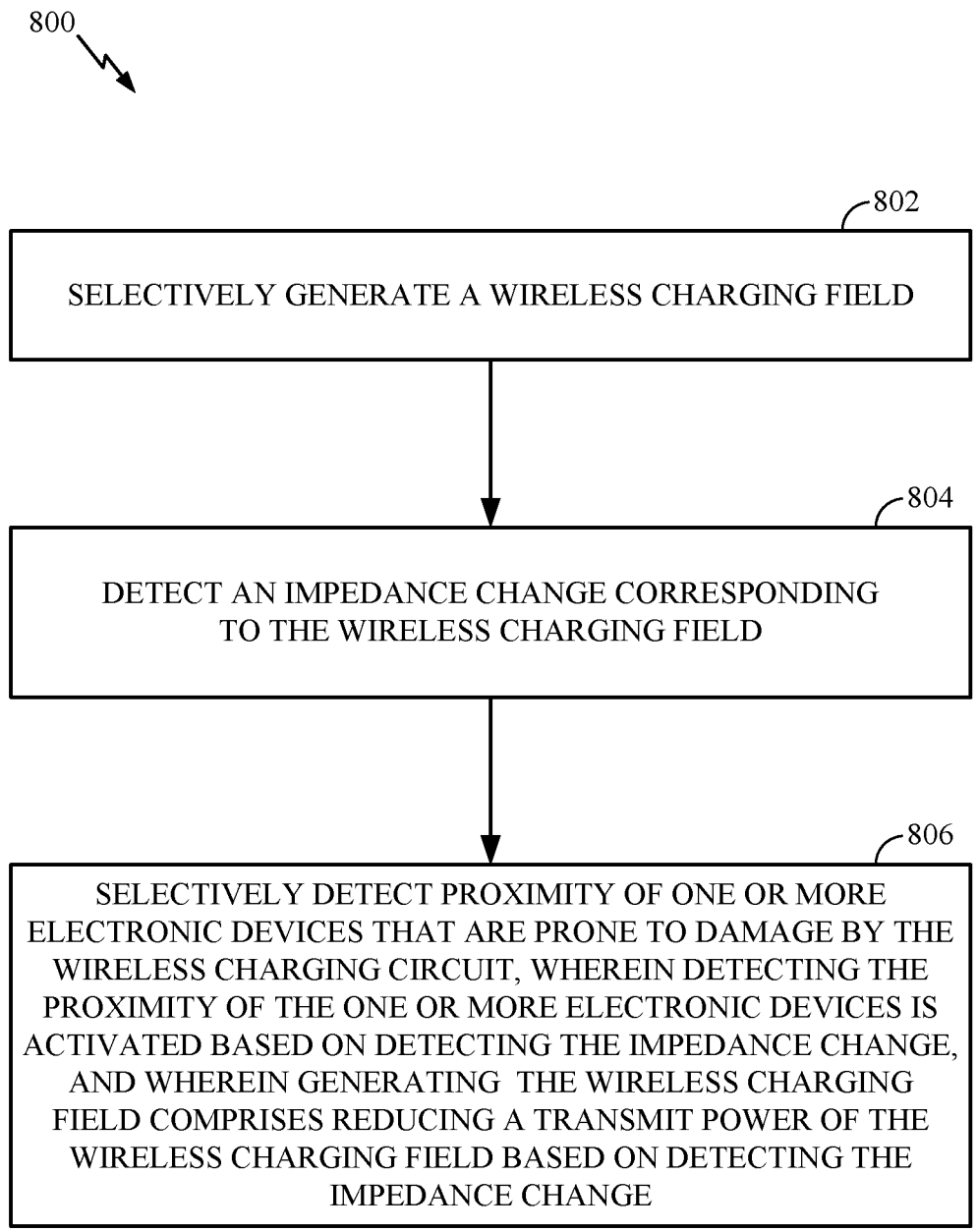
FIG. 8 is a flow diagram of example operations for wireless charging, in accordance with certain aspects of the present disclosure.

FIG. 8 is a flow diagram of example operations 800 for wireless charging, in accordance with certain aspects of the present disclosure. The operations 800 may be performed by a circuit, such as the circuits of FIGS. 1-6.

The operations 800 may begin, at block 802, by selectively generating a wireless charging field. At block 804, an impedance change corresponding to the wireless charging field may be detected. At block 806, the operations 800 continue by selectively detecting proximity of one or more electronic devices that are prone to damage by the wireless charging circuit, wherein detecting the proximity of the one or more electronic devices is activated based on detecting the impedance change, and wherein generating the wireless charging field comprises reducing a transmit power of the wireless charging field based on detecting the impedance change. In certain aspects, reducing the transmit power of the wireless charging field comprises disabling the generation of the wireless charging field.

In certain aspects, the one or more electronic devices comprise at least one of an near field communication (NFC) card or radio-frequency identification (RFID) card. In some cases, selectively detecting proximity of one or more electronic devices comprises modulating a detection field for detecting the at least one NFC card or RFID card, and detecting the at least one NFC card or RFID card is based on receiving information via modulation of the detection field by the at least one NFC card or RFID card.

In certain aspects, selectively generating the wireless charging field may include selectively transmitting, during one or more first time intervals, one or more beacons for detection of one or more other electronic devices to be charged. In this case, selectively detecting proximity of the electronic devices selectively may include detecting proximity of the electronic devices during one or more second time intervals that are different than the one or more first time intervals. In certain aspects, transmitting the one or more beacons is disabled based on the proximity of the one or more electronic devices.

In certain aspects, generating the wireless charging field and the proximity detection is performed via a shared coil. In this case, circuitry used for generating the wireless charging field may be electrically isolated from the shared coil when detecting proximity of the electronic devices is activated. In some cases, circuitry used for detecting proximity of the electronic devices may be electrically isolated from the shared coil when generating the wireless charging field is activated.

In certain aspects, detecting proximity of the electronic devices is performed while generating the wireless charging field. In certain aspects, detecting proximity of the one or more electronic devices comprises transmitting a detection field and detecting modulations in the detection field. In some cases, transmitting the detection field comprises modulating the detection field.

Figure 9:
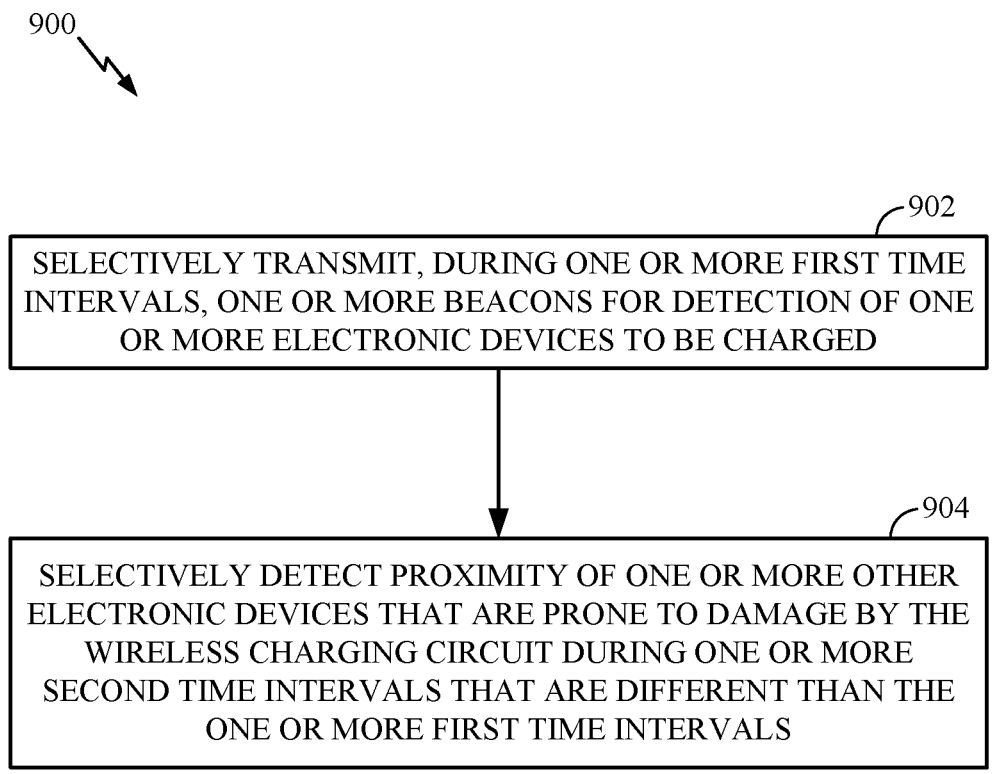
FIG. 9 is a flow diagram of example operations for wireless charging including beacon transmissions, in accordance with certain aspects of the present disclosure.

FIG. 9 is a flow diagram of example operations 900 for wireless charging, in accordance with certain aspects of the present disclosure. The operations 900 may be performed by a circuit, such as the circuits of FIGS. 1-6.

The operations 900 may begin, at block 902, by selectively transmitting, during one or more first time intervals, one or more beacons for detection of one or more electronic devices to be charged. At block 904, the circuit may selectively detect proximity of the electronic devices comprises selectively detecting proximity of the electronic devices during one or more second time intervals that are different than the one or more first time intervals.

In certain aspects, transmitting the one or more beacons is disabled based on the detected proximity of the one or more other electronic devices. In some cases, the one or more other electronic devices comprise at least one of an NFC card or a radio-frequency identification (RFID) card, wherein the transmitting the one or more beacons is disabled based on the detected proximity of the least one of the NFC card or the RFID card. In certain aspects, the wireless charging circuit is configured to charge the one or more electronic devices by generating a wireless charging field based on the detection of the one or more other electronic devices via the one or more beacons. In certain aspects, the operations 900 also include detecting an impedance change corresponding to the wireless charging field, wherein the generating the wireless charging field is disabled based on the detected impedance change.

While certain examples provided herein have described proximity detection with respect to an NFC device to facilitate understanding, aspects of the present disclosure may be applied to any other type of circuit configured to detect proximity of electronic devices. For example, proximity detection may be performed via RFID circuitry.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless charging, comprising:
   a wireless charging circuit configured to selectively generate a wireless charging field; and
   an impedance detection circuit coupled to the wireless charging circuit and configured to detect an impedance change corresponding to the wireless charging field;
   a proximity detection circuit configured to selectively detect proximity of one or more electronic devices that are prone to damage by the wireless charging circuit, wherein the proximity detection circuit is configured to transmit a detection field and detect modulations in the detection field to detect proximity of the one or more electronic devices, wherein detecting the proximity of the one or more electronic devices is activated based on detecting the impedance change, and wherein the wireless charging circuit is configured to reduce a transmit power of the wireless charging field based on detecting the impedance change.

2. The apparatus of claim 1, wherein reducing the transmit power of the wireless charging field comprises disabling the generation of the wireless charging field.

3. The apparatus of claim 1, wherein the one or more electronic devices comprise at least one of an near field communication (NFC) card or radio-frequency identification (RFID) card and the proximity detection circuit is configured to modulate the detection field for detecting the at least one NFC card or RFID card, wherein detecting the at least one NFC card or RFID card is based on receiving information via modulation of the detection field by the at least one NFC card or RFID card.

4. The apparatus of claim 1, wherein:
   the wireless charging circuit is configured to selectively transmit, during one or more first time intervals, one or more beacons for detection of one or more other electronic devices to be charged; and
   the proximity detection circuit is configured to selectively detect proximity of the one or more electronic devices during one or more second time intervals that are different than the one or more first time intervals.

5. The apparatus of claim 4, wherein transmitting the one or more beacons is disabled based on the proximity of the one or more electronic devices.

6. The apparatus of claim 4, wherein the one or more electronic devices comprise at least one of an NFC card or a radio-frequency identification (RFID) card, wherein the transmitting the one or more beacons is disabled based on the detected proximity of the least one of the NFC card or the RFID card.

7. The apparatus of claim 4, wherein the wireless charging circuit is configured to charge the one or more other electronic devices by generating the wireless charging field based on the detection of the one or more other electronic devices via the one or more beacons.

8. The apparatus of claim 1, wherein detecting the impedance change comprises detecting a change in impedance of a signal presented to the wireless charging circuit while generating the wireless charging field.

9. The apparatus of claim 1, wherein the wireless charging circuit and the proximity detection circuit share at least one coil.

10. The apparatus of claim 9, wherein:
    the at least one coil comprises a first coil and a second coil;
    a first terminal of the first coil and a first terminal of the second coil are coupled to the wireless charging circuit; and
    a second terminal of the first coil and a second terminal of the second coil are coupled to the proximity detection circuit.

11. The apparatus of claim 10, wherein the first terminal of the first coil and the first terminal of the second coil are coupled when generating the wireless charging field is activated.

12. The apparatus of claim 10, wherein the second terminal of the first coil and the second terminal of the second coil are coupled when detecting proximity of the one or more electronic devices is activated.

13. The apparatus of claim 10, wherein:
    the wireless charging circuit comprises a first amplifier having an output coupled to a first tuning circuit that is coupled to the first terminals of the first and second coils; and
    the proximity detection circuit comprises a second amplifier having an output coupled to a second tuning circuit that is coupled to the second terminals of the first and second coils; and
    the apparatus further comprises an isolation circuit configured to electrically couple the first terminals of the first and second coils during wireless charging and the second terminals of the first and second coils during proximity detection.

14. The apparatus of claim 13, wherein the isolation circuit is configured to electrically couple the first and second terminals of the first and second coils to a reference potential.

15. The apparatus claim 1, wherein the proximity detection circuit comprises an in-phase and quadrature (I/Q) demodulator configured to detect proximity of the one or more electronic devices, and wherein the I/Q demodulator is also used for detecting the impedance change corresponding to the wireless charging field.

16. The apparatus of claim 1, wherein the proximity detection circuit is configured to modulate the detection field.

17. An apparatus for wireless charging, comprising:
    a wireless charging circuit;
    a proximity detection circuit;
    a first coil having a first terminal coupled to the wireless charging circuit and a second terminal coupled to the proximity detection circuit;
    a second coil having a first terminal coupled to the wireless charging circuit and a second terminal coupled to the proximity detection circuit;
    at least one first switch coupled between the first terminals of the first coil and the second coil; and
    at least one second switch coupled between the second terminals of the first coil and the second coil.

18. The apparatus of claim 17, wherein:
the wireless charging circuit further comprises:
  a first tuning circuit coupled to the first terminals of the first coil and the second coil; and
  a first amplifier coupled to the first tuning circuit; and
the proximity detection circuit comprises:
  a second tuning circuit coupled to the second terminals of the first coil and the second coil; and
  a second amplifier coupled to the second tuning circuit.

19. The apparatus of claim 17, wherein:
the second switch is closed during operation of the wireless charging circuit; and
the first switch is closed during operation of the proximity detection circuit.

20. A method for wireless charging, comprising:
selectively generating a wireless charging field;
detecting an impedance change corresponding to the wireless charging field; and
selectively detecting proximity of one or more electronic devices that are prone to damage by the wireless charging field, wherein detecting the proximity of the one or more electronic devices is activated based on detecting the impedance change, wherein detecting proximity of the one or more electronic devices comprises transmitting a detection field and detecting modulations in the detection field, and wherein generating the wireless charging field comprises reducing a transmit power of the wireless charging field based on detecting the impedance change.

21. The method of claim 20, wherein the one or more electronic devices comprise at least one of an near field communication (NFC) card or radio-frequency identification (RFID) card, and wherein selectively detecting proximity of one or more electronic devices comprises modulating the detection field for detecting the at least one NFC card or RFID card, wherein detecting the at least one NFC card or RFID card is based on receiving information via modulation of the detection field by the at least one NFC card or RFID card.

22. The method of claim 20, wherein:
selectively generating the wireless charging field comprises selectively transmitting, during one or more first time intervals, one or more beacons for detection of one or more other electronic devices to be charged; and
selectively detecting proximity of the one or more electronic devices comprises selectively detecting proximity of the one or more electronic devices during one or more second time intervals that are different than the one or more first time intervals.

23. The method of claim 22, wherein transmitting the one or more beacons is disabled based on the proximity of the one or more electronic devices.

24. The method of claim 20, wherein generating the wireless charging field and the proximity detection is performed via a shared coil, the method further comprising:
electrically isolating circuitry used for generating the wireless charging field from the shared coil when detecting proximity of the one or more electronic devices is activated.

25. The method of claim 20, wherein generating the wireless charging field and the proximity detection is performed via a shared coil, the method further comprising:
electrically isolating circuitry used for detecting proximity of the one or more electronic devices from the shared coil when generating the wireless charging field is activated.

26. The method of claim 20, wherein detecting proximity of the one or more electronic devices is performed while generating the wireless charging field.

27. A method for wireless charging, comprising:
selectively generating a wireless charging field; and
detecting an impedance change corresponding to the wireless charging field; and
selectively detecting proximity of one or more electronic devices that are prone to damage by the wireless charging field, wherein detecting the proximity of the one or more electronic devices is activated based on detecting the impedance change, and wherein generating the wireless charging field is disabled based on detecting the impedance change, wherein the one or more electronic devices comprise at least one of an near field communication (NFC) card or radio-frequency identification (RFID) card, and wherein selectively detecting proximity of one or more electronic devices comprises modulating a detection field for detecting the at least one NFC card or RFID card, wherein detecting the at least one NFC card or RFID card is based on receiving information via modulation of the detection field by the at least one NFC card or RFID card.

28. The method of claim 27, wherein:
selectively generating the wireless charging field comprises selectively transmitting, during one or more first time intervals, one or more beacons for detection of one or more other electronic devices to be charged; and
selectively detecting proximity of the one or more electronic devices comprises selectively detecting proximity of the one or more electronic devices during one or more second time intervals that are different than the one or more first time intervals.

29. The method of claim 28, wherein transmitting the one or more beacons is disabled based on the detected proximity of the one or more other electronic devices.

* * * * *